May 24, 1938.   A. E. McGOWAN   2,118,734
PULLEY CLUTCH
Filed June 7, 1937   2 Sheets-Sheet 1

Inventor
Albert E. McGowan

By *Clarence A. O'Brien*
*Hyman Berman*
Attorneys

May 24, 1938.  A. E. McGOWAN  2,118,734
PULLEY CLUTCH
Filed June 7, 1937  2 Sheets-Sheet 2

Inventor
Albert E. McGowan

By Clarence A. O'Brien
Hyman Berman
Attorneys

Patented May 24, 1938

2,118,734

UNITED STATES PATENT OFFICE 2,118,734

PULLEY CLUTCH

Albert E. McGowan, Carlisle, Pa.

Application June 7, 1937, Serial No. 146,916

1 Claim. (Cl. 192—66)

This invention appertains to new and useful improvements in clutches and more particularly to a clutch of the pulley controlling type.

The principal object of the present invention is to provide a clutch for interposition between a motor shaft and a pulley driven thereby.

Another important object of the invention is to provide a clutch means for pulleys of the stepped type.

Other important objects and advantages of the invention will become apparent to the reader of the following specification.

In the drawings:—

Figure 1:
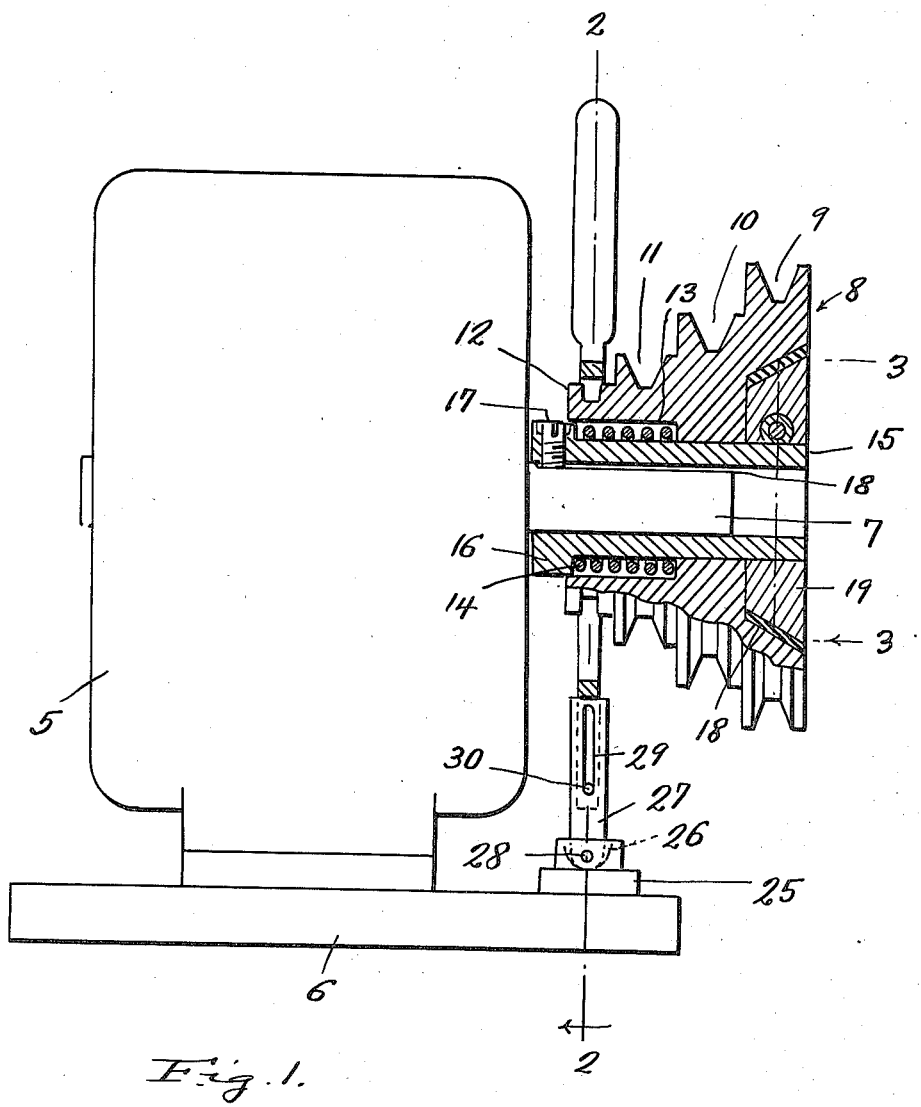
Figure 1 represents a side elevational view of the pulley drive motor showing the pulley and clutch means in vertical section.

Referring to the drawings wherein like numerals designate like parts, it can be seen that numeral 5 denotes a motor having the base 6 and armature shaft 7.

Numeral 8 generally refers to the pulley which is of the outwardly stepped type having in the present instance three steps in which the belt grooves 9, 10 and 11 respectively, are located and beyond the grooved step 11 is the grooved collar-like formation 12 having an internal counter-bore 13 for receiving the spring 14.

A sleeve 15 is provided with the shoulder 16 on one end. This sleeve is disposed over the armature shaft 7 and has the set screw 17 therein adapted to be driven against the flat portion 18 of the armature shaft 7. The coiled compressible spring is located in the counterbore 13 between the inner end thereof and the said shoulder 16 for normally tending to urge the pulley structure 8 outwardly so that its outwardly flaring pocket 18 will have its wall structure engage with the frusto-conical shaped clutch member 19 which is fixed to the sleeve 15 by the wedge member 20. In other words, this clutch member 19 is secured to the sleeve 15 by feeding the screw 21 into the threaded bore 22 of the clutch element 19 so as to pull the wedge 20 in the pocket 23 against the periphery of the sleeve 15. In this manner the clutch element 19 is secured to the sleeve 15. Furthermore, in view of the above disclosure the pulley structure 18 is always maintained in clutch engaged position.

Figure 2:
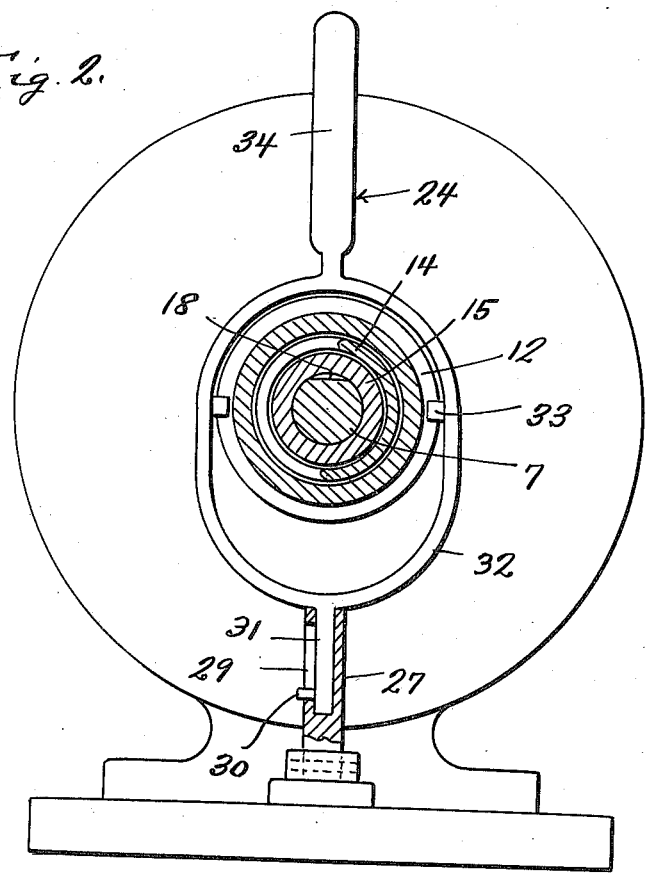
Figure 2 is a vertical sectional view taken substantially on the line 2—2 of Figure 1.
Figure 3:
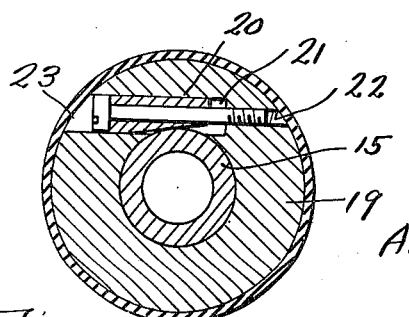
Figure 3 is a sectional view substantially on the line 3—3 of Figure 1.

To disconnect the pulley structure from the armature shaft 7, control means generally referred to by numeral 24 is provided. This means consists of a block 25 mounted on the motor base 6 and in this is the pocket 26 for receiving the lower end of the hollow post 27, which is pivotally secured in the said pocket by the pin 28. The upper portion of this post 27 is slotted as at 29 to receive the laterally disposed pin 30 of the depending shank 31 of the ovate-shaped loop 32, this shank 31 depending into the said post 27 as shown in Figure 2.

This loop 32 has its side portions provided with inwardly disposed trunnions 33 which bear into the grooved collar 12.

From the upper portion of the loop structure 32 extends the handle 34.

It can now be seen, that by moving the handle 34 toward the motor 5, the pulley structure 8 can be moved against the tension of the spring 14 so as to disengage the pulley from the clutch element 19, thus freeing the pulley while the motor is in operation.

When desired, the handle 34 can be moved upwardly to disengage the trunnions 33 from the collar 12 after which the handle 34 can be thrown against the housing of the motor, thus disconnecting the control 24 entirely from the pulley structure.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

In a clutch assembly, a rotary element, a clutch member fixedly secured to the rotary element, a slidable clutch element on the rotatable element, spring means on the rotatable element for forcing the slidable clutch element into engaged relation with the fixed clutch element, said slidable clutch element being provided with a circumferential groove, manual control means for sliding the slidable clutch element, said manual control means consisting of an elliptical frame-like structure disposed around the grooved portion of the slidable clutch element and provided at its upper end with an upstanding handle and at its lower end with an extension and means for swingably supporting the lower end of the extension, said means for swingably supporting the lower end of the extension consisting of a stationary upstanding tubular member provided with a longitudinal slot therein, said tubular member being adapted to receive the extension, and a pin on the extension for slidable disposition in the said slot of the tubular member.

ALBERT E. McGOWAN.